United States Patent
Oh et al.

(10) Patent No.: US 6,487,880 B1
(45) Date of Patent: Dec. 3, 2002

(54) OPTICAL FIBER PREFORM MANUFACTURING APPARATUS

(75) Inventors: Sung-Koog Oh, Kumi-shi; Man-Seok Seo, Kwangju-kwangyokshi; Jin-Seong Yang; Mun-Hyun Do, both of Kumi-shi, all of (KR)

(73) Assignee: Samsung Electronics, Co., Ltd., Suwon (KR)

( * ) Notice: Subject to any disclaimer, the term of this patent is extended or adjusted under 35 U.S.C. 154(b) by 0 days.

(21) Appl. No.: 09/457,392

(22) Filed: Dec. 9, 1999

(30) Foreign Application Priority Data

Dec. 10, 1998 (KR) .............................. 98-54193

(51) Int. Cl.$^7$ .............................................. C03B 37/07
(52) U.S. Cl. .............................. 65/488; 65/484; 65/508
(58) Field of Search .......................... 65/483, 488, 484, 65/507, 508

(56) References Cited

U.S. PATENT DOCUMENTS

| | | |
|---|---|---|
| 3,982,916 A | 9/1976 | Miller |
| 4,154,591 A | 5/1979 | French et al. |
| 4,636,236 A | 1/1987 | Glessner et al. |
| 4,820,322 A | 4/1989 | Baumgart et al. |
| 4,822,399 A * | 4/1989 | Kanamori et al. ............ 65/3.12 |
| 5,090,978 A * | 2/1992 | O'Brien, Jr. ..................... 65/2 |
| 5,658,363 A | 8/1997 | Ince et al. |
| 5,917,109 A | 6/1999 | Berkey |

* cited by examiner

*Primary Examiner*—Christopher A. Fiorilla
(74) *Attorney, Agent, or Firm*—Robert E. Bushnell, Esq.

(57) ABSTRACT

Disclosed are an optical fiber preform manufacturing apparatus and method in which processes for shrinking and closing a deposited tube are conducted using a device suitable for those processes, which device is other than the device used in a deposition process for forming the deposited tube on the inner surface of a preform tube, thereby reducing the processing time while reducing the amount of OH penetrated from the preform tube into a vitreous component of the deposited tube, thereby achieving a reduction in OH loss. In accordance with the optical fiber preform manufacturing apparatus and method, operations are conducted which involve setting the heating temperature of a circular heater to a temperature lower than the softening point of a deposited tube, exhausting contaminants existing in the interior of the deposited tube while moving the circular heater at a desired temperature, setting the heating temperature of the circular heater to a temperature not lower than the softening point of the deposited tube, and shrinking and closing the deposited tube while moving the circular heater to a desired temperature.

14 Claims, 4 Drawing Sheets

OPTICAL FIBER PREFORM MANUFACTURING APPARATUS

CLAIM OF PRIORITY

This application makes reference to, incorporates the same herein, and claims all benefits accruing under 35 U.S.C. §119 from my application OPTICAL FIBER PREFORM MANUFACTURING APPARATUS AND METHOD FOR SHRINKAGE AND CLOSING OF DEPOSITED TUBE filed with the Korean Industrial Property Office on Dec. 10, 1998 and there duly assigned Ser. No. 54193/1998.

BACKGROUND OF THE INVENTION

1. Field of the Invention

The present invention relates to an apparatus for and a method of manufacturing an optical fiber preform, and more particularly to an optical fiber preform manufacturing apparatus and method for more effectively shrinking and closing a deposited tube.

2. Description of the Related Art

Manufacture of optical fiber preforms using a modified chemical vapor deposition (MCVD) method is well known. In a deposition process in which a deposited layer is formed in the form of a tube on the inner surface of a preform tube in accordance with the MCVD method, the deposited tube is shrunk by itself, that is, the internal diameter of the deposited tube decreases, as the thickness of the deposited layer increases gradually. To this end, a burner configured to have a large heating area while using a low flame pressure is typically used in the deposition process. The large heating area of the burner makes it possible to allow an easy heat transfer to the inner portion of a preform tube, thereby achieving an improved deposition efficiency. On the other hand, the low flame pressure of the burner results in a reduced undesirable shrinkage of the deposited tube occurring during the deposition process. However, it is necessary to use a high flame pressure in a tube shrinking and closing process to be conducted for the deposited tube, as different from the deposition process. Where a burner suitable for the deposition process is used for the shrinking and closing process, in spite of the above mentioned fact, it is necessary to move the burner at a low speed while keeping a high heating temperature in order to allow the deposited tube to be softened at the low flame pressure used. As a result, the processing time of the tube shrinking and closing process occupies a large portion of the entire processing time of the optical fiber preform manufacture process. For this reason, the conventional tube shrinking and closing process serves as a great obstacle to a reduction in processing time.

The high heating temperature and low moving speed of the burner in the tube shrinking and closing process result in a degradation in the optical characteristics of optical fibers finally produced, as follows. That is, a trace of moisture (generally, several ppm) contained in the preform tube penetrates into the layer deposited on the inner surface thereof. The penetrated moisture is coupled to $P_2O_5$ or $SiO_2$ of the deposited layer, thereby forming P—O—H or Si—O—H bonds. OH reaching the core region of the deposited layer is coupled to $SiO_2$ or $GeO_2$ of the deposited layer, thereby forming Si—O—H or Ge—O—H bonds while releasing Si—O or Ge—O bonds. These O—H or P—O—H bonds resulting from the coupling of the moisture to the compounds of the deposited layer at respective regions of the deposited layer serve to generate an optical loss in the optical fiber, finally produced, due to an absorption band established in a particular wavelength range. OH penetrated into the core layer forms mono-oxygen, thereby resulting in a degradation in the structural uniformity of the vitreous components in the core layer. This causes a non-uniformity in density of the core layer. As a result, an increase in scattering loss occurs.

Second, where the preform tube is heated in a rotating state at its lower end by the burner, a circumferential temperature gradient occurs. The temperature gradient results in a non-uniformity in viscosity of the preform tube. As a result, the balance of surface tension in the deposited tube is lost, thereby causing the deposited tube to be deformed in shape. This causes an increase in the non-circularity of the deposited tube. As the shrinking process advances, the non-circularity of the deposited tube increases, thereby resulting in an increase in polarization mode dispersion.

Conventionally, the deposition process, shrinking process, and closing process have been conducted using the same burner, which is suitable only for the deposition process, in spite of the fact that those processes involve different mechanisms, respectively. For this reason, an increase in the thickness of the deposited layer occurs. This causes various problems such as a deformed geometrical structure of the deposited tube, a degradation in the optical characteristics of optical fibers finally produced, and an increased processing time.

Examples of apparatus and methods for making optical fiber preforms of the conventional art are seen in the following U.S. Patents.

U.S. Pat. No. 3,892,916, to Miller, entitled Method For Forming Optical Fiber Preform, describes a modified chemical vapor deposition process in which asymmetric heating is used to produce circumferentially alternating deposits of doped and undoped glass.

U.S. Pat. No. 4,154,591, to French et al., entitled Fabrication Of Optical Fibers With Improved Cross Sectional Circularity, describes a method for collapsing a tubular preform under positive internal pressure.

U.S. Pat. No. 4,636,236, to Glessner et al., entitled Method For Producing A Preform For Drawing Optical Fibers, describes a method for making a preform in which a tubular glass body having a doped layer is collapsed with a partial vacuum formed in the interior of the tubular glass body.

U.S. Pat. No. 4,820,322, to Baumgart et al., entitled Method Of And Apparatus For Overcladding A Glass Rod, describes a method for collapsing a tube onto a preform rod in which the pressure inside the tube is maintained at a value which is less than that outside the tube.

U.S. Pat. No. 5,658,363, to Ince et al., entitled Method Of Joining A Tube To A Rod Having An Annular Rib, So As To Form An Optical Fiber Preform, describes a method of collapsing a tube onto a rod in which the collapsing step comprises applying suction to the annular space at one end of the assembly.

U.S. Pat. No. 5,917,109, to Berkey, entitled Method of Making Optical Fiber Having Depressed Index Core Region, describes a method of making an optical fiber preform in which an overclad tube is collapsed onto a rod.

Based on our reading of the art, then, we have decided that what is needed is a faster method of manufacturing an optical fiber preform which avoids the above-mentioned problems.

SUMMARY OF THE INVENTION

It is therefore an object of the present invention to provide an improved method of manufacturing an optical fiber preform.

It is also an object of the invention to provide an improved apparatus for manufacturing an optical fiber preform.

A further object of the invention is to provide a method of manufacturing an optical fiber preform in which non-circularity of the preform is decreased.

A yet further object of the invention is to provide a method in which the processing time of shrinking the preform is reduced.

A still further object of the invention is to produce a preform in which there is a reduced penetration of OH from the preform tube into a vitreous component of the preform tube.

The present invention has been made to achieve the above-described objects. Therefore, it is an object of the present invention to provide an optical fiber preform manufacturing apparatus and method in which processes for shrinking and closing a deposited tube are conducted using a device suitable for those processes, which device is other than the device used in a deposition process for forming the deposited tube on the inner surface of a preform tube, thereby reducing the processing time while reducing the amount of OH penetrated from the preform tube into a vitreous component of the deposited tube, thereby achieving a reduction in OH loss.

In accordance with one aspect, the present invention provides an optical fiber preform manufacturing apparatus for shrinking and closing a deposited tube comprising: a lathe for supporting a deposited tube in such a fashion that it extends vertically, the deposited tube having a clad layer and a core layer while being sealed at one end thereof; a circular heater arranged around the deposited tube while being circumferentially spaced apart from the deposited tube by a desired distance, the circular heater serving to supply heat to the deposited tube supported by the lathe and being movable upwardly and downwardly at a desired speed; a vacuum pump connected to the other end of the deposited tube and adapted to pump air existing in the interior of the deposited tube using a vacuum; and a process control unit for setting a heating temperature of the circular heater to a desired temperature, and conducting a control operation for processes of shrinking and closing the deposited tube while upwardly and downwardly moving the circular heater.

In accordance with another aspect, the present invention provides an optical fiber preform manufacturing method comprising the steps of: depositing a clad layer and a core layer on an inner surface of a preform tube, thereby forming a deposited tube; shrinking one end of the deposited tube, thereby sealing the one end of the deposited tube; arranging the deposited tube in such a fashion that it extends vertically through a circular heater; moving the circular heater to the sealed end of the deposited tube, and then adjusting a heating temperature of the circular heater to be not lower than a softening point of the deposited tube; and heating the deposited tube while moving the circular heater at a desired speed, thereby shrinking and closing the deposited tube.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

The present invention discloses an optical fiber preform manufacturing method and apparatus which involve a process for depositing a reaction product of raw material gas on the inner surface of a preform tube, thereby forming a deposited tube, and a process for shrinking and closing the deposited tube, thereby obtaining an optical fiber preform. The deposition process is carried out in accordance with a well-known deposition method, for example, an MCVD method. On the other hand, the shrinking and closing process is simply and rapidly carried out in accordance with the present invention.

Figure 1:
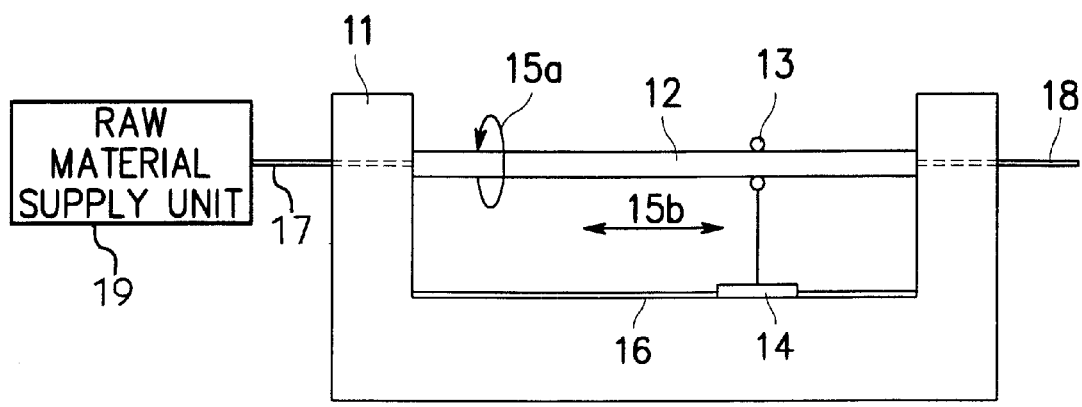
FIG. 1 is a view illustrating a deposition apparatus suitable for an MCVD process.

FIG. 1 is a view illustrating a deposition apparatus suitable for an MCVD process. This deposition apparatus is used to deposit a reaction product of raw material gas in the inner surface of a preform tube. Referring to FIG. 1, a lathe 11 is illustrated which serves to support a preform tube 12. A heating means 14 heats partially the preform tube 12 when viewed in both the longitudinal and circumferential directions of the preform tube 12. In FIG. 1, the region where the preform tube is heated is denoted by the reference numeral 13. The preform tube 12 rotates in a direction, for example, the direction indicated by the arrow 15a in FIG. 1. The heating means 14 moves on track 16 in directions indicated by the arrows 15b in FIG. 1 in accordance with the operation of a moving member (not shown). Accordingly, the heating region 13 is defined while not only moving along the entire length of the preform tube 12, but also rotating around the circumference of the preform tube 12. Raw material gas is introduced from a raw material gas supply unit 19 into the preform tube 12 via an input tube 17. The raw material gas supply unit 19 contains a reactant of a liquid phase therein and supplies this reactant to the preform tube 12 using carriage gas. Exhaust materials are discharged from the preform tube 12 through an outlet 18. The flow rate of the raw material gas is controlled by a mixing valve (not shown) and a shutoff valve (not shown).

In accordance with the MCVD method, highly pure raw material gas such as $SiCl_4$, $GeCl_4$, or $POCl_3$ is blown into a glass preform tube along with oxygen. When heat is applied to the glass preform tube using a heating means, a thermal oxidation is generated, so that an oxide is deposited in the form of soot on the inner surface of the preform tube. At this time, a clad layer and a core layer are deposited on the inner surface of the preform tube under the condition in which the refractive indexes of those layers are adjusted by precisely controlling the concentration of the raw material gas. Thus, a deposited tube is formed on the inner surface of the preform tube. After completion of the deposition process, the preform tube is heated again by the heating means, so that the deposited tube is shrunk. Thus, an optical fiber preform is obtained.

Figure 2:
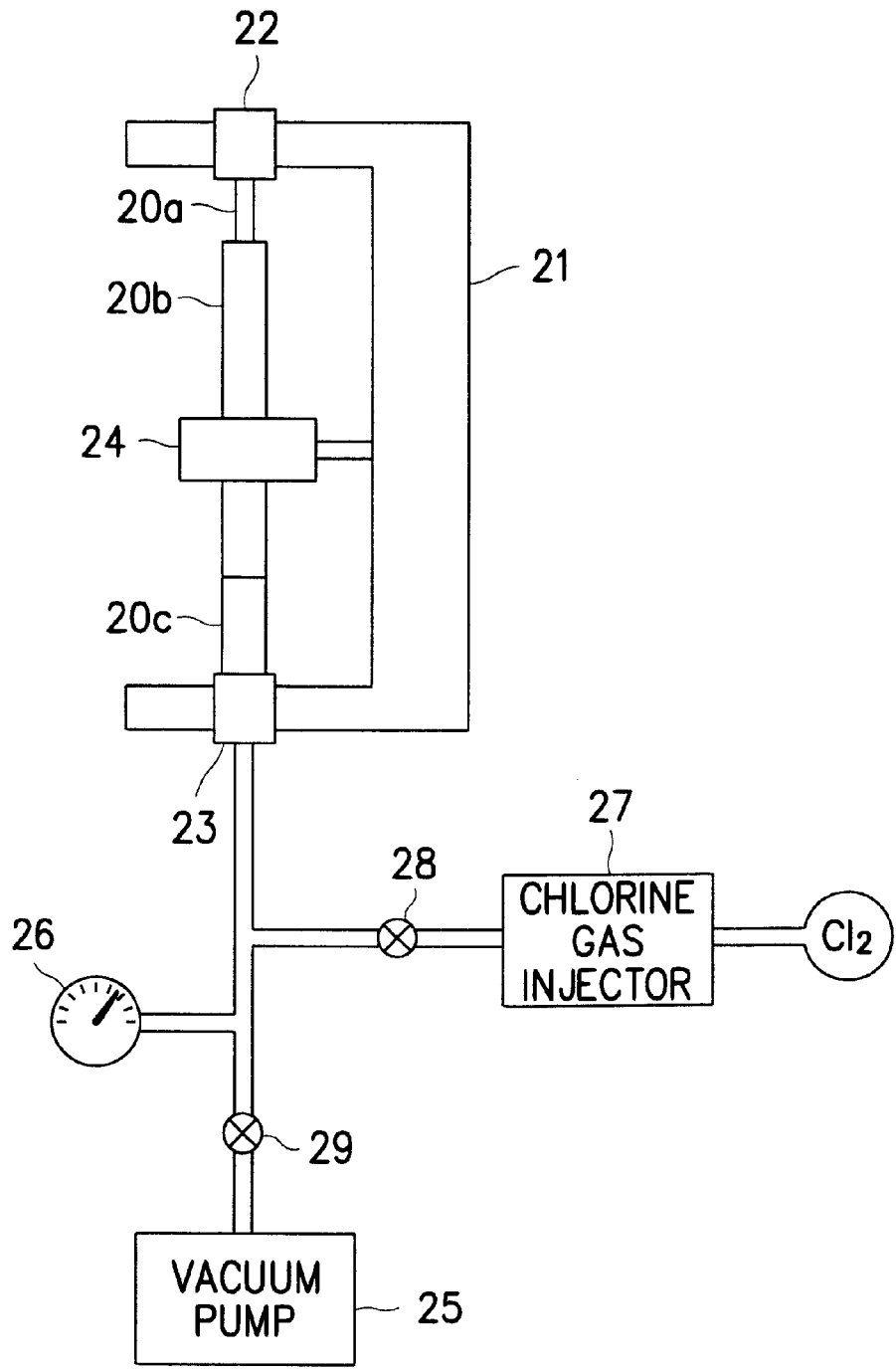
FIG. 2 is a view illustrating an optical fiber preform manufacturing apparatus capable of conducting the shrinking and closing processes in accordance with the present invention.

FIG. 2 is a view illustrating an optical fiber preform manufacturing apparatus capable of conducting the shrinking and closing processes in accordance with the present invention. This apparatus is adapted to shrink and close the deposited tube produced by the apparatus of FIG. 1.

As shown in FIG. 2, the optical fiber preform manufacturing apparatus according to the present invention includes a lathe 21 for supporting a deposited tube, to be treated, by its upper and lower support members 22 and 23 in such a fashion that the deposited tube extends vertically. The optical fiber preform manufacturing apparatus also includes a circular heater 24 for heating the deposited tube, a vacuum pump 25 for pumping air or other contaminants existing in the deposited tube using a vacuum, a pressure meter 26 for measuring the pumping pressure of the vacuum pump 25, a chlorine gas injector 27 for supplying chlorine gas into the deposited tube, and valves, that is, a vacuum exhaust value 29 and a gas supply valve 28. For the circular heater 24, a burner or a furnace may be used. The circular heater 24 is configured to provide a sufficient amount of heat while being controlled in flame pressure, so that it is suitable for the shrinking and closing processes, as compared to the heating means of FIG. 1 suitable for the deposition process.

In the optical fiber preform manufacturing apparatus having the above mentioned configuration, a deposited tube 20b, which may be manufactured by the apparatus of FIG. 1, is supported by the lathe 21. The deposited tube 20b has a sealed end to which a rod 20a is connected. The upper support member 22 supports the rod 20a connected to the sealed end of the deposited tube 20b whereas the lower support member 23 supports the other end of the deposited tube 20b, which end is open. The lathe 21 also has a length adjusting member 20c adapted to adjust the tube support length of the lathe 21. The circular heater 24, which serves to supply heat to the deposited tube 20b, is arranged around the deposited tube 20b while being radially spaced apart from the deposited tube 20b by a desired distance. The circular heater 24 is movable vertically along the deposited tube 20b at a desired speed. The chlorine gas injector 27 supplies chlorine gas to the deposited tube 20b through the lower support member 23 of the lathe 21 in order to remove moisture existing in the deposited tube 20b.

The optical fiber preform manufacturing apparatus also includes a control unit not shown. The control unit performs control operations for the processes of shrinking and closing the deposited tube 20b. That is, the control unit sets the heating temperature of the circular heater 24 to a desired temperature, and rotates the deposited tube 20b supported between the upper and lower support members 22 and 23 at a desired speed while vertically moving the circular heater 24. The heating temperature of the circular heater 24 is first adjusted to be lower than the softening point of the deposited tube 20b. In this state, the circular heater 24 is moved at a desired speed. During the movement of the circular heater 24, contaminants existing in the deposited tube 20b are then exhausted in accordance with an operation of the vacuum pump 27. Thereafter, the heating temperature of the circular heater 24 is adjusted again so that it is not lower than the softening point of the deposited tube 20b. In this state, the processes of shrinking and closing the deposited tube 20b is carried out. Where a furnace is used for the circular heater 24, inert gas such as argon or nitrogen is supplied to the furnace in order to prevent an oxidation thereof at a heat generating region.

In accordance with the apparatus of the present invention, the deposited tube is vertically arranged during the tube shrinking and closing process. Heat is supplied to the vertically-arranged deposited tube by the circular heater arranged around the deposited tube while using a high flame pressure. During the heating, the deposited tube is evacuated using a vacuum. By virtue of such features, it is possible to considerably reduce the processing time while preventing the deposited tube from having a non-circularity, as compared to conventional methods.

Figure 3:
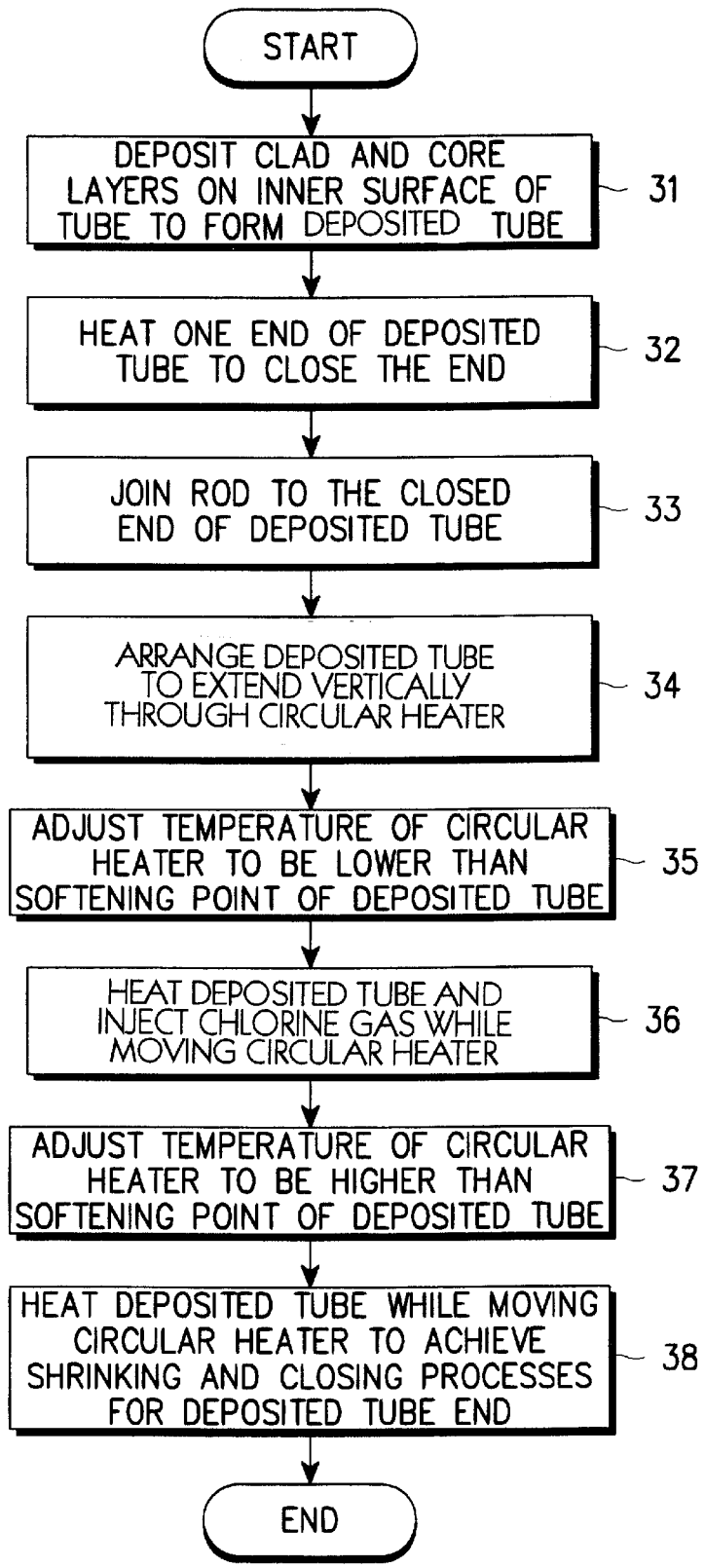
FIG. 3 is a flow chart illustrating a method for manufacturing optical fiber preforms in accordance with the present invention.

FIG. 3 is a flow chart illustrating an optical fiber preform manufacturing apparatus according to the present invention.

In accordance with this method, a clad layer and a core layer are first deposited on the inner surface of a preform tube horizontally arranged, using the apparatus shown in FIG. 1, thereby forming a deposited tube (Step 31). Thereafter, the deposited tube is locally heated at one end thereof corresponding to a region where chemical raw gas is exhausted during the deposition process, thereby causing the end to be sealed (Step 32). A rod is horizontally joined to the sealed end of the deposited tube (Step 33). The rod-joined deposited tube is separated from the lathe, and then fed to the tube shrinking/closing lathe shown in FIG. 2. In the tube shrinking/closing lathe, the deposited tube is then vertically arranged in such a fashion that it extends vertically through the circular heater while the rod is upwardly directed (Step 34). Subsequently, the circular heater is moved to the joint between the deposited tube and rod. The heating temperature of the circular heater is then adjusted so that it is lower than the softening point of the deposited tube. In this state, the circular heater is upwardly and downwardly moved at a low speed to heat the deposited tube. The chlorine gas injector supplies chlorine gas to the deposited tube through the lower support member of the lathe in order to remove moisture existing in the deposited tube. At the same time, the vacuum exhaust value is opened to remove contaminants, including moisture, from the interior of the deposited tube (Step 36).

The movements of the circular heater are carried out in such a fashion that when the circular heater, which moves downwardly from the joint to the lower end of the deposited tube, reaches the lower end, the moving direction is changed to allow the circular heater to move upwardly to the joint. After the evacuation of the deposited tube, the heating temperature of the circular heater is adjusted again so that it is not lower than the softening point of the deposited tube (Step 37). When the circular heater reaches a predetermined temperature during the operation thereof, it is maintained at that temperature for 2 or 3 minutes to obtain a temperature stability. Thereafter, the vacuum pump operates to maintain the interior of the deposited tube in a negative pressure state. In this state, the deposited tube is heated under the condition in which the circular heater moves downwardly at a desired speed, thereby causing the deposited tube to be shrunk and closed (Step 38). The shrinking and closing processes of step 38 are conducted under the condition in which the deposited tube rotates at a desired speed of, typically, 10 rpm or less. The shrinkage of the deposited tube may be achieved by conducting the shrinking process one time or several times. After the shrinkage of the deposited tube, the deposited tube is closed to form a solid preform. Where a furnace is used for the circular heater, inert gas such as argon or nitrogen is supplied to the interior of the furnace in order to prevent an oxidation thereof at a heat generating region.

Figure 4A:
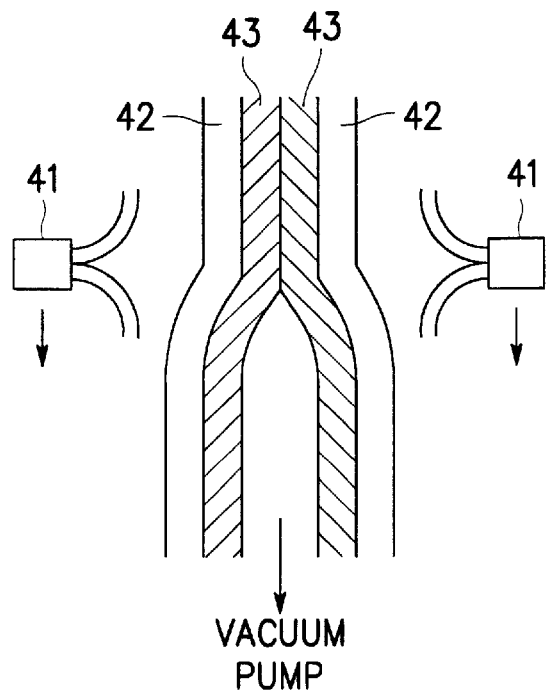
FIGS. 4a and 4b are views respectively illustrating examples in which a burner or a furnace is used as a heating means.
Figure 4B:
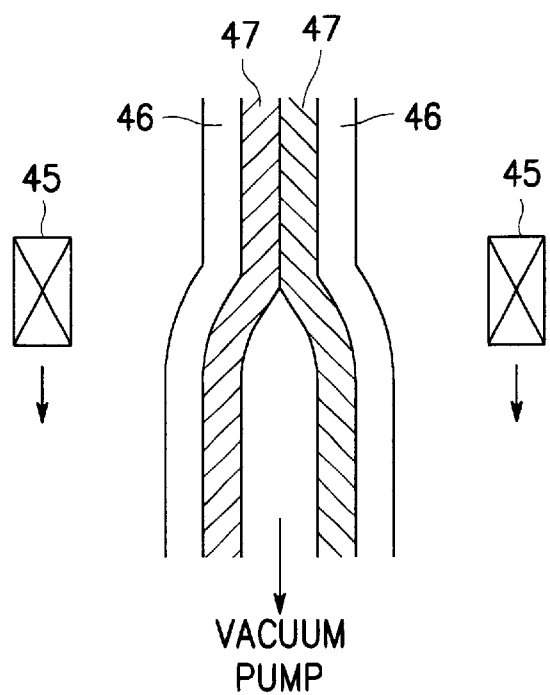

FIGS. 4a and 4b are views respectively illustrating examples in which a burner or a furnace is used as the circular heater. In the case of FIG. 4a, a circular burner 41 applies heat to a deposited tube having a deposited clad/core layer 43 deposited on the inner surface of a preform tube 42, around the deposited tube, while moving downwardly, thereby shrinking and closing the deposited tube. During this heating process, a vacuum is generated in the interior of the deposited tube in order to allow the deposited tube to be more easily shrunk and closed. In the case of FIG. 4b, a circular furnace 45 applies heat to a deposited tube having a deposited clad/core layer 47 deposited on the inner surface of a preform tube 46, around the deposited tube, while moving downwardly, thereby shrinking and closing the deposited tube.

As apparent from the above description, the present invention provides an optical fiber preform manufacturing apparatus and method in which processes for shrinking and closing a deposited tube are conducted using a device suitable for those processes, which device is other than the device used in a deposition process for forming the deposited tube on the inner surface of a preform tube, thereby reducing the processing time to a degree corresponding to half that of the conventional method or less. This is because the processing time of the tube shrinking and closing process occupies a large portion (⅔ or more) of the entire processing time of the optical fiber preform manufacture process. In accordance with the present invention, the shrinking and closing process are carried out under the condition in which a negative pressure is applied to the interior of the deposited tube. Accordingly, it is possible to further reduce the processing time while considerably reducing the period of time, for which the deposited tube is exposed at a high temperature. This results in a reduction in the amount of OH penetrated from the preform tube into a vitreous component of the deposited tube, thereby achieving a reduction in OH loss. Since a circular burner or circular furnace is used as the heating means for the shrinking and closing processes, there is no or little surface temperature gradient in association with heat applied to the deposited tube. Accordingly, it is possible to reduce a non-circularity of the deposited tube. This results in a reduction in polarization mode dispersion.

While the present invention has been particularly shown and described with reference to a particular embodiment thereof, it will be understood by those skilled in the art that various changes in form and detail may be effected therein without departing from the scope of the invention as defined by the appended claims.

What is claimed is:

1. An optical fiber preform manufacturing apparatus for shrinking and closing a deposited tube, comprising:
   a lathe for supporting vertically a deposited tube being sealed at one end and unsealed at the other end thereof, said lathe comprising a detachable rod connecting the sealed end to said lathe, an upper support member for supporting said detachable rod, and a lower support member for supporting the unsealed end;
   a circular heater arranged around the deposited tube while being circumferentially spaced apart from the deposited tube by a desired distance, said circular heater for supplying heat to the deposited tube supported by the lathe and being movable upwardly and downwardly at a desired speed;
   a vacuum pump connected to the unsealed end of the deposited tube for pumping air existing in the interior of the deposited tube using a vacuum; and
   a process control unit for setting a heating temperature of the circular heater to a desired temperature, and conducting a control operation for processes of shrinking and closing the deposited tube while upwardly and downwardly moving the circular heater.

2. The optical fiber preform manufacturing apparatus according to claim 1, further comprised of the lower support member cooperating with the upper support member to rotate the deposited tube at a desired speed during the tube shrinking and closing processes.

3. The optical fiber preform manufacturing apparatus according to claim 1, further comprising:
   a chlorine gas injector for supplying chlorine gas to the interior of the deposited tube to remove moisture generated in the interior of the deposited tube due to heat from the circular heater.

4. The optical fiber preform manufacturing apparatus according to claim 1, wherein the circular heater comprises a furnace.

5. The optical fiber preform manufacturing apparatus according to claim 4, further comprising an inert gas injector for supplying inert gas to the furnace to prevent an oxidation of the furnace at a heat generating region.

6. The optical fiber preform manufacturing apparatus according to claim 1, wherein the circular heater comprises a burner.

7. The optical fiber preform manufacturing apparatus according to claim 1, wherein the process control unit comprises means for conducting sequential control operations for setting the heating temperature of the circular heater to a temperature lower than a softening point of the deposited tube, exhausting contaminants existing in the interior of the deposited tube while moving the circular heater at a desired temperature, setting the heating temperature of the circular heater to a temperature not lower than the softening point of the deposited tube, and shrinking and closing the deposited tube while moving the circular heater to a desired temperature.

8. The optical fiber preform manufacturing apparatus according to claim 1, wherein the process control unit comprises means for conducting a control operation for rotating the deposited tube supported by the lathe at a desired speed during the shrinking and closing processes.

9. The apparatus of claim 1, said lathe further comprising a length-adjusting member for adaptably supporting the lower end of the deposited tube.

10. An apparatus for manufacturing an optical fiber preform, comprising:
   a vertical lathe for supporting and rotating a deposited tube sealed at one end around a vertical axis, said vertical lathe comprising:
   a detachable rod connecting the sealed end of the deposited tube to said vertical lathe;
   an upper support member for supporting said detachable rod; and
   a length-adjusting member for adaptably supporting the lower end of the deposited tube;
   a circular heater mounted on the vertical lathe, said heater surrounding a portion of the deposited tube and being moveable vertically along the length of the deposited tube;
   a chlorine gas injector connected to the lower support member, for supplying chlorine gas to the inside of the deposited tube through the lower support member; and
   a vacuum pump connected to the lower support member, for removing gas from the deposited tube.

11. The apparatus of claim 10, further comprising:

a control unit connected to the circular heater, said control unit comprising:

means for controlling the temperature of the circular heater; and means for moving the circular heater up or down at a desired speed.

12. The apparatus of claim 11, said control unit further comprising:

means for controlling the operation of said vacuum pump.

13. The apparatus of claim 10, said circular heater being a furnace, and the apparatus further comprising:

an inert gas supply connected to the furnace for preventing oxidation of the furnace.

14. The apparatus of claim 10, said vertical lathe further comprising a lower support member for supporting the lower end of the deposited tube, said lower support member cooperating with the upper support member to rotate the deposited tube at a desired speed during the tube shrinking and closing processes.

* * * * *